United States Patent
Forsberg

[11] Patent Number: 5,709,296
[45] Date of Patent: Jan. 20, 1998

[54] FEEDER TUBE

[76] Inventor: Göran Forsberg, Tuggelitevägen 3A, S-653 50 Karlstad, Sweden

[21] Appl. No.: 704,561
[22] PCT Filed: Mar. 21, 1995
[86] PCT No.: PCT/SE95/00284
  § 371 Date: Sep. 11, 1996
  § 102(e) Date: Sep. 11, 1996
[87] PCT Pub. No.: WO95/26310
  PCT Pub. Date: Oct. 5, 1995

[30] Foreign Application Priority Data

Mar. 29, 1994 [SE] Sweden .................. 9401049

[51] Int. Cl.$^6$ ........................................ B65G 33/12
[52] U.S. Cl. .............................. 198/658; 198/671
[58] Field of Search ........................ 198/658, 670, 198/671; 414/311, 321, 326, 526

[56] References Cited

U.S. PATENT DOCUMENTS

| | | | |
|---|---|---|---|
| 3,788,446 | 1/1974 | Postel-Vinay | 198/658 X |
| 4,266,902 | 5/1981 | Forsberg | 198/658 X |
| 4,351,627 | 9/1982 | Forsberg | 198/658 X |
| 4,393,609 | 7/1983 | Persson | 198/671 X |
| 4,511,066 | 4/1985 | Forsberg | 198/671 X |

FOREIGN PATENT DOCUMENTS 2748003  4/1978  Germany.

*Primary Examiner*—James R. Bidwell
*Attorney, Agent, or Firm*—Griffin, Butler, Whisenhunt & Kurtossy

[57] ABSTRACT

The invention relates to a feeder tube intended for bulk product, which comprises a cylindrical tube (2) in which there are inlet openings (8, 18) distributed along the length of the tube, a screw conveyor (3) disposed coaxially within the tube, rotating the tube about its axis, rotating the screw conveyor relative to the tube, moving the feeder tube in the lateral direction, and activators (9A, 9B, 19) for the bulk product, which activators are disposed on the tube in association with the inlet openings and form projections on the outer side of the tube. Each inlet opening has at least one first portion (10A, 10B, 20A, 20B) which is limited in the direction of rotation by a hole edge (11A, 11B, 21A, 21B) without an activator, and one second portion at the rear end of the first portion is limited by an activator (9A, 9B, 19).

7 Claims, 2 Drawing Sheets

FIG. 2.

FEEDER TUBE

TECHNICAL FIELD

The invention concerns a device relating to a feeder tube, i.e. a conveyor intended for bulk product, in particular a feed-out device, which comprises a cylindrical drum or tube in which there are accommodated inlet openings distributed along the length of the tube, a screw conveyor disposed coaxially within the tube, means for rotating the tube about its axis, means for rotating the screw conveyor relative to the tube, means for displacing the feeder tube in the lateral direction, and activators for the bulk product, which activators are disposed on the tube in association with the inlet openings and form projections on the outer side of the tube.

PRIOR ART

Feeder tubes of the above-stated type are previously known and commonly used. Examples of such feeder tubes are described in Swedish Patent Applications 7611862-9 and 8004449-8. Feeder tubes can be used as conveyors for a host of different bulk products (bulk material) such as wood chips, coal, paper pulp, peat, sand, cement, ashes, grain, pellets, etc. In order to facilitate the movements of the goods in the silo or equivalent in which the bulk product is stored and stimulate its feed-in through feed-in openings, activators, i.e. projections on the tube, are located at the back edge of the inlet openings. By back edge is herein meant the rear edge of the inlet opening viewed in the direction of rotation.

If the tube is considered in cross-section and it is assumed that the tube is rotated in the clockwise direction, then there is a risk of bulk product becoming wedged between the tube and the bottom of the silo or equivalent if the feeder tube is displaced to the right in the considered section, especially if the distance between the feeder tube and floor is relatively small, which it should be in order to achieve optimal working conditions for the feeder tube. This jamming can be eliminated if the rotation of the tube is reversed. In this case, however, no effective feed-in and/or activation of the bulk product is obtained, since in this case the activators come to be situated at the leading (front) edge of the feed-in openings and are essentially inactive. A particularly serious drawback with the said original feeder tube is that it is not suitable for use for material which is difficult to feed, such as damp forest waste, bark and similar materials which may contain fragments of longer branches, large chips, long bark flakes and similar fragments. Product of this kind is able to be forcibly fed using a conventional screw conveyor, provided that there are very large drive forces available and the screw, the force transmission and the bearings are given correspondingly large dimensions, but the wear becomes very great and the working life of the screw, above all, is disagreeably short. As far as the feeder tube in its original construction is concerned, this can by no means be used for handling this difficult-to-feed material and, however much the drive power is increased, this is no help. It does not help for the tube to be provided with activators on the one side of the inlet openings, as shown in Swedish Patent Specification 7611862-9. Nor does it help if such activators as are shown in the patent specification, i.e. activators which extend along the entire length of the openings, are disposed on both sides of the feed openings. In this case, the activating effect is completely eliminated. If one either has a tube which is without activators, a tube with activators according to SE 7611862-9, or activators on both sides of the feed-in openings and constructed according to the patent specification, then the result, when it is a case of the said difficult-to-feed material, is simply that the material packs harder and harder or merely swirls around, or that the tube becomes jammed.

BRIEF DISCLOSURE OF THE INVENTION

The object of the invention is to eliminate the above-mentioned problems. Other objects which can also be achieved by virtue of the invention, at least in certain embodiments thereof, are that symmetrical working relationships can be achieved regardless of the direction of travel (displacement of the feeder tube in the lateral direction).

Further advantages and characteristics of the invention derive from the appending patent claims and the following description of some preferred embodiments.

BRIEF DESCRIPTION OF THE DRAWINGS

In the following description of some preferred embodiments, reference will be made to the appended drawings, in which.

DESCRIPTION OF PREFERRED EMBODIMENTS

Figure 1:
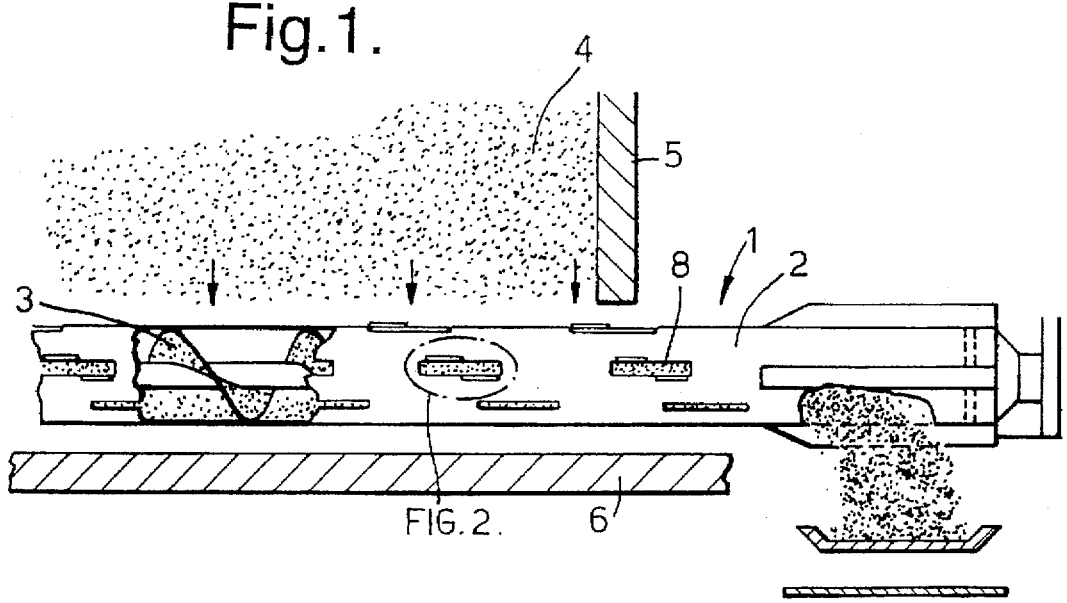
FIG. 1 shows a portion of a feeder tube disposed in a silo for bulk product.

With reference first to FIG. 1, a feeder tube having a known basic construction is denoted in general reference by the numeral 1. This comprises a cylindrical tube 2 and a screw conveyor 3 disposed coaxially within the tube. Further, there are one or more motors for rotating the tube 2 about its axis and for rotating the screw conveyor 3 relative to the tube and so-called "traversing gear" for moving the entire feeder tube in the lateral direction. This lateral displacement can be effected directly at right-angles to the axis of the feeder tube 1 or about a centre of rotation, i.e. along an arc-shaped direction of travel. A silo for bulk product 4 is denoted by 5 and the bottom of the silo is denoted by 6. That which has hitherto been described belongs to the prior art and does not therefore constitute any pan of the new invention.

Figure 2:
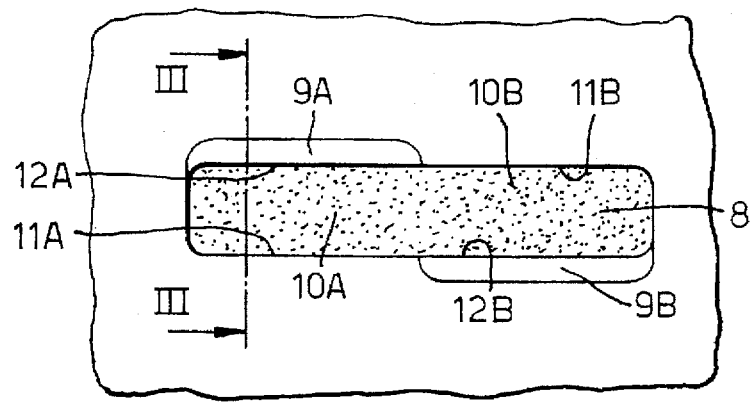
FIG. 2 shows an inlet opening to the feeder tube according to a first embodiment on a larger scale.

The novelty lies in the design of the inlet openings and of the activators associated with the inlet openings. The feeder tube shown in FIG. 1 is primarily intended for difficult-to-handle and/or fibrous material, e.g. fuel consisting of forest products, particularly so-called "crashed forest fuel", in which occasional larger fragments can occur and/or in which the material is easily entwined such that arching can easily arise. In order to prevent such arches and in order also to be able to handle occasional larger, often oblong fragments, it is expedient that the tube 2, along its length, is provided with a number of helically distributed inlet openings 8, which are relatively large, in particular in the longitudinal direction of the tube. FIG. 2 illustrates in greater detail how such an inlet opening 8 appears according to a preferred embodiment. As has been stated, it should be relatively large and elongated in the longitudinal direction of the tube 2. The length can measure, for example, between 300 and 500 mm, whilst the width can measure, for example, between 100 and 300 mm. Within the forest industry also, for the handling of sawmill chips, a feeder tube having this hole geometry can be advantageous. Along the one longitudinal side, the hole edge is designed along half its length as a first activator 9A in the form of a projection of the tube wall at the hole edge. The height of this projection/activator normally measures between 5 and 20 mm. On the opposite side and within the second half of the hole edge there is a second activator 9B. The two activators 9A and 9B are thus disposed diagonally relative to each other and accommodate half each of the longitudinal side of the inlet opening 8. As a result of this geometry, there is always, regardless of the direction of rotation of the tube 2, a portion 10A or 10B, i.e. the one or the other half of the inlet opening 8, which is limited in the direction of rotation by a hole edge 11A or 11B, which has no activator, and by a hole edge 12A or 12B, which is provided with an activator 9A or 9B. The activators 9A and 9B comprise, according to the embodiment, projections of the tube in the region of the respective hole edge portion 12A and 12B. The height of the activators 9A and 9B is between about 5 and about 20 mm.

Figure 4:
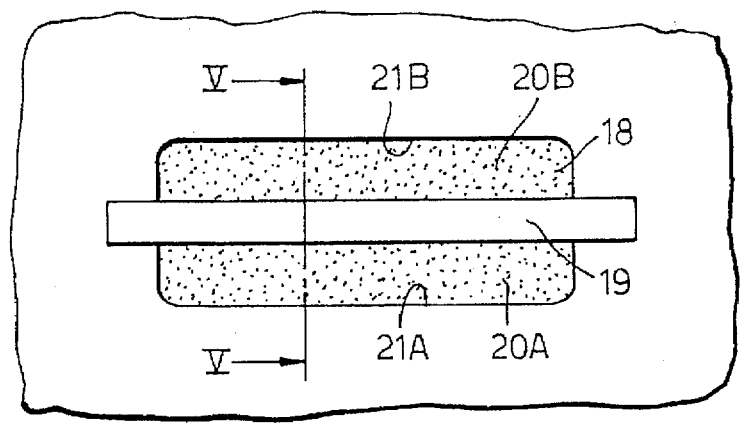
FIG. 4 shows an inlet opening according to a second embodiment.
Figure 5:
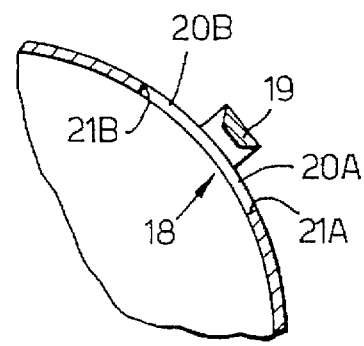
FIG. 5 shows a section V—V of the inlet opening in FIG. 4.
Figure 6:
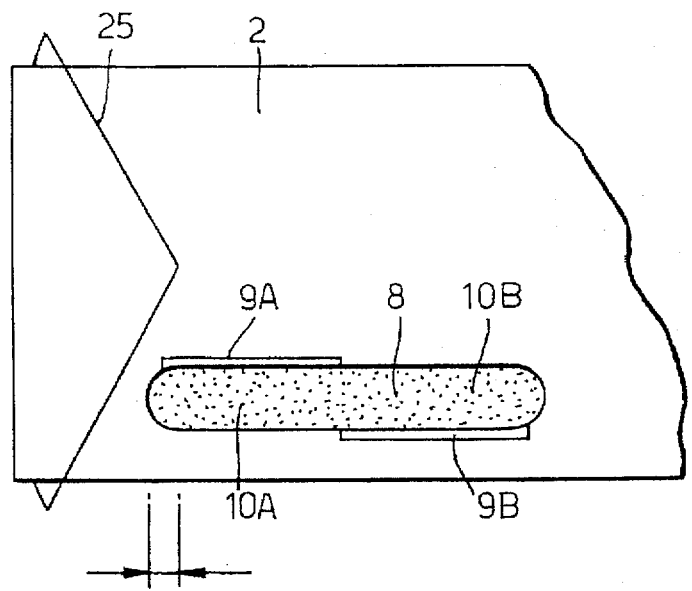
FIG. 6 illustrates the outer design of the tube at the end thereof.

In the case of a more easy-to-handle bulk product, e.g. sand or pellets, the inlet openings should be smaller. It is desirable that the bulk product should arch over the hole when the tube 2 is stationary and that it should automatically trickle in when the tube 2 rotates and activates the material with the aid of the activators. FIG. 4 shows a smaller inlet opening of this kind for material which is easier to handle and less inclined to arch. This inlet opening also, which is denoted by 18 in FIGS. 4 and 5, has a shape which is elongated in the axial direction. The length can measure, for example, 50–150 mm and the total width 20–100 mm. The activator 19 consists in this case of an iron member, which extends centrally as a bridge over the inlet opening in the longitudinal direction of the latter. The activator 19 divides the inlet opening into two portions 20A and 20B, so that each such portion 20A or 20B is limited on the one side by the activator 19 and on the other side by a hole edge 21A or 21B, which has no activator.

In both embodiments, symmetrical relationships are attainable regardless of the direction of travel, thereby making it possible, where there is risk of jamming, to reverse the tube, whilst at the same time maintaining good feed-in conditions. In order to be able to make use of these facilities in the tube according to the invention, the device according to the invention comprises means for reversing the rotation of the tube, i.e. means for being able to rotate the tube in both directions according to requirement. The apparatus further comprises means for rotating the screw feeder disposed in the tube relative to the tube, regardless of the direction of rotation of the tube. Normally, the screw feeder is constantly rotated in the same direction, regardless of the direction of rotation of the tube, so as always to feed the material in one and the same direction. In order always to have the same rotation speed for the screw feeder relative to the tube, regardless of the direction of rotation of the tube, the screw feeder according to a preferred embodiment is arranged such that it can be rotated at varying absolute rotation speeds.

Still another alternative, which has not been shown in the drawings, is possible, namely that essentially every second inlet opening has an activator along the front edge of the opening viewed in the direction of rotation, whilst the rest of the inlet openings have an activator along the rear edge of the opening. At the end at which there are no inlet holes, the tube 2 is provided with outer threads 25— comprising both left-threaded and right-threaded portions—in order, regardless of the direction of rotation of the tube, to activate the bulk product and feed it in towards the nearest inlet opening 8.

Figure 3:
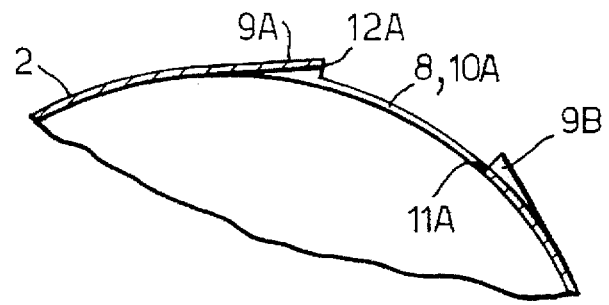
FIG. 3 shows a section III—III of the inlet opening in FIG. 2.

In the field-testing of a feeder tube according to FIGS. 1–3, the feeder tube is installed in a silo for forest chippings, a material which is very difficult to feed, this being impossible to feed using previously known feeder tubes for reasons which have previously been described in the disclosure of the prior art. In the silo, a conventional feeder tube with a drive power of 115 kW had previously been used. With the drive force which this power could provide, the product could be fed out with difficulty, but at the expense of very rapid wear and resultant discarding of the screw. By using the new feeder tube according to the invention, which also operates in reverse running, the feed-out of the same, normally extremely difficult-to-handle material proceeded very well. The maximum available power could be reduced to 30 kW, yet there was no need for even this power to be fully utilized.

I claim:

1. In a feeder tube device for conveying a bulk product, which comprises a cylindrical tube in which there are a number of inlet openings distributed along the length of the tube, a screw conveyor disposed coaxially within the tube, means for rotating the tube about its axis, means for rotating the screw conveyor relative to the tube, means for moving the feeder tube in the lateral direction, and activators for the bulk product, which activators are disposed on the tube in association with the inlet openings and form projections on an outer side of the tube, the improvement wherein each inlet opening has at least one first portion which is limited in a direction of rotation of the tube by a hole edge without an activator, and at least one second portion, at a rear end of the said first portion, which is limited by an activator.

2. Device according to claim 1, wherein said first portion consists of one half of at least certain of the inlet openings in the longitudinal direction of the tube, the said activator being disposed at a rear edge within the said half of the inlet opening, and at another half of the same inlet opening the activator is disposed on an opposite side of the inlet opening, so that the activators are disposed on opposite sides of the inlet opening, diagonally relative to each other.

3. Device according to claim 1, wherein the activator extends as a longitudinal bridge in the axial direction over the inlet opening.

4. In a feeder tube device for conveying a bulk product, which comprises a cylindrical tube in which there are a number of inlet openings distributed along the length of the tube, a screw conveyor disposed coaxially within the tube, means for rotating the tube about its axis, means for rotating the screw conveyor relative to the tube, means for moving the feeder tube in the lateral direction, and activators for the bulk product, which activators are disposed on the tube in association with the inlet openings and form projections on an outer side of the tube, the improvement wherein certain of the inlet openings have an activator along a leading edge of the opening viewed in a direction of rotation, and other inlet openings have an activator along a rear edge of the opening in the same direction of rotation.

5. Device according to claim 1, wherein the inlet openings are elongated in the axial direction of the tube.

6. Device according to claim 1, wherein the activators have a height of no less than 5 and no more than 20 mm.

7. Device according to claim 1, wherein the said means for rotating the tube are arranged so as to be able to rotate the tube in both directions of rotation, and said means for rotating the screw conveyor are arranged so as to rotate the screw conveyor relative to the tube regardless of the direction of rotation of the tube.

* * * * *